United States Patent
Goldston

(10) Patent No.: US 9,836,619 B1
(45) Date of Patent: Dec. 5, 2017

(54) DIGITAL VAULT FOR MUSIC OWNERS

(71) Applicant: TuneGo, Inc., Henderson, NV (US)

(72) Inventor: Mark Goldston, Beverly Hills, CA (US)

(73) Assignee: TuneGo, Inc., Henderson, NV (US)

( * ) Notice: Subject to any disclaimer, the term of this patent is extended or adjusted under 35 U.S.C. 154(b) by 0 days.

(21) Appl. No.: 15/430,871

(22) Filed: Feb. 13, 2017

(51) Int. Cl.
 *G06F 21/62* (2013.01)
 *G06F 17/30* (2006.01)
 *G06F 21/10* (2013.01)

(52) U.S. Cl.
 CPC .... *G06F 21/6218* (2013.01); *G06F 17/30752* (2013.01); *G06F 17/30778* (2013.01); *G06F 21/10* (2013.01); *G06F 2221/0713* (2013.01)

(58) Field of Classification Search
 CPC ........... G06F 21/6218; G06F 17/30752; G06F 17/30778; G06F 21/10; G06F 2221/0713
 USPC .......................................................... 726/28
 See application file for complete search history.

(56) References Cited

U.S. PATENT DOCUMENTS

| | | | | |
|---|---|---|---|---|
| 7,920,528 | B2 * | 4/2011 | Karaoguz ........... | H04L 63/0492 370/338 |
| 8,484,089 | B1 * | 7/2013 | Lin ........................ | G06Q 30/06 705/26.1 |
| 9,397,998 | B2 * | 7/2016 | Ford ...................... | H04L 63/08 |
| 2005/0091681 | A1 * | 4/2005 | Borden ............ | G11B 20/00086 725/31 |
| 2007/0220092 | A1 * | 9/2007 | Heitzeberg .......... | H04L 12/1818 709/204 |
| 2008/0065547 | A1 * | 3/2008 | Shimizu .............. | G06F 21/6209 705/51 |
| 2008/0163312 | A1 * | 7/2008 | Faust ..................... | H04N 7/163 725/93 |
| 2008/0175190 | A1 * | 7/2008 | Lee .......................... | G06F 21/10 370/328 |
| 2008/0280598 | A1 * | 11/2008 | Delegue ............... | H04M 3/533 455/414.1 |

(Continued)

OTHER PUBLICATIONS

The Spotify Community, How long do you have to listen for a song to count as "played"?, Message Board between Nov. 11, 2014 and Jan. 4, 2017, https://community.spotify.com/t5/forums/replypage/board-id/002/message-id/14842, last accessed Jan. 5, 2017, 8 total pages.

(Continued)

*Primary Examiner* — Abu Sholeman
(74) *Attorney, Agent, or Firm* — SoCal IP Law Group LLP; Steven C. Sereboff

(57) ABSTRACT

There is disclosed a digital vault for music owners having a number of modules. An account management module is for creating accounts with the digital vault for plural music owners. An access control module is for providing the music owners secure access to their respective accounts. The access control module also provides reviewing users access to the songs in a music owner's account. A song upload module is for the music owners to upload songs into the music owners' respective accounts. A sharing module is for the music owners to provide reviewing users with access to their songs. A listening module is for the reviewing users to stream the songs in the digital vault to which the music owners have given them access. A song management module provides the music owners various options for managing the songs in their accounts.

32 Claims, 5 Drawing Sheets

(56) References Cited

U.S. PATENT DOCUMENTS

| | | | | |
|---|---|---|---|---|
| 2008/0318669 | A1* | 12/2008 | Buchholz | G07F 17/32 463/25 |
| 2011/0083085 | A1* | 4/2011 | Steelberg | G06Q 30/02 715/753 |
| 2014/0081846 | A1* | 3/2014 | Gallagher | G06Q 40/02 705/39 |
| 2014/0289516 | A1* | 9/2014 | Sahay | H04L 9/3263 713/162 |
| 2014/0297655 | A1* | 10/2014 | Paglia | H04L 67/22 707/748 |
| 2014/0336798 | A1* | 11/2014 | Emerson, III | G10L 19/018 700/94 |
| 2014/0336799 | A1* | 11/2014 | Emerson, III | G10L 19/018 700/94 |
| 2014/0359465 | A1* | 12/2014 | Litan Sever | G06F 3/04817 715/738 |
| 2015/0177938 | A1* | 6/2015 | Kleinpeter | G06F 17/30575 715/738 |
| 2015/0207786 | A1* | 7/2015 | Pitroda | G06F 17/30011 726/28 |
| 2015/0235276 | A1* | 8/2015 | Wilson | G06Q 30/0273 705/14.69 |
| 2016/0005135 | A1* | 1/2016 | Bokestad | G06Q 50/01 705/319 |
| 2016/0098393 | A1* | 4/2016 | Hebert | G06F 17/28 704/9 |
| 2016/0275194 | A1* | 9/2016 | Borza | G06F 17/30395 |
| 2016/0352523 | A1* | 12/2016 | Bisbee | H04L 9/3247 |
| 2017/0024399 | A1* | 1/2017 | Boyle | G06F 17/30964 |

OTHER PUBLICATIONS

Stinson, Jamie, "Spotify drops five-plays-per-song limit for free users", MSE News article, published Mar. 19, 2013, http://www.moneysavingexpert.com/news/shopping/2013/03/spotify-drops-five-play-per-song-limit-for-free-users?_ga=1.81803094.1534910942.1487007596, 2 total pages.

* cited by examiner

1

DIGITAL VAULT FOR MUSIC OWNERS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to controlled distribution of digital music.

Description of the Related Art

A number of services provide digital distribution for musicians and the entertainment industry. Most of these services provide a platform for musicians to distribute their works. They allow the musician to upload songs and in some cases set pricing. Once uploaded the songs are typically available to anyone, typically through a website. Musicians generally rely upon these services to promote the availability of the service to the general public, and desire this kind of broad distribution. These services typically also provide reporting on downloads.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Figure 1:
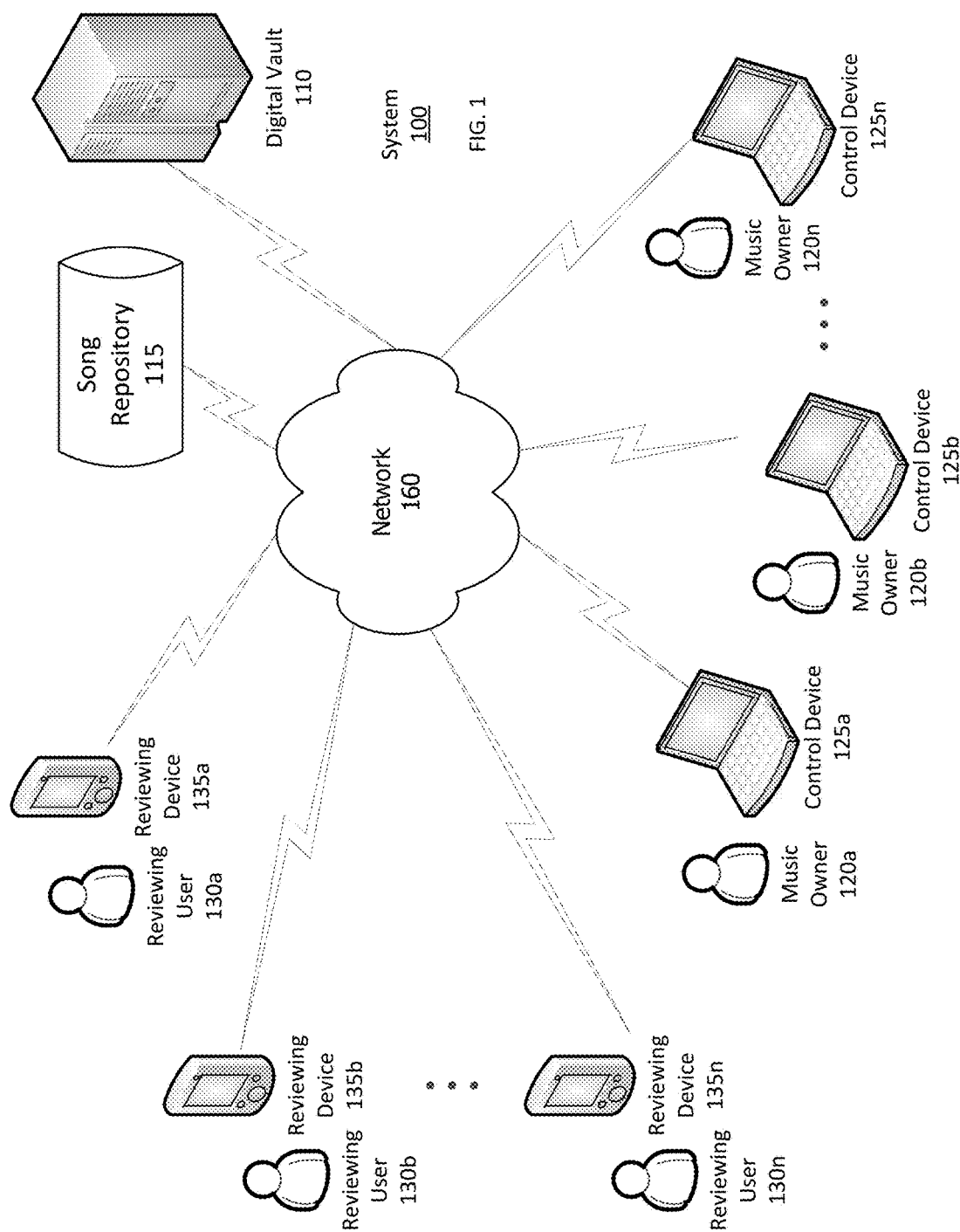
FIG. 1 is a diagram of a system for controlled distribution of digital music.

Referring now to FIG. 1 there is shown a diagram of a system 100 for controlled distribution of digital music. The system 100 includes a digital vault 110, song repository 115, two or more control devices 125 and two or more reviewing devices 135. A network 160 connects the various devices for intercommunications. The network 160 may be wired or wireless or combination, may be packet switched and/or circuit-switched or a combination, may include public and private LANs and WANs and may include or be the Internet.

The digital vault 110 is a hardware system providing digital vault services as described herein. The hardware of the digital vault 110 may be shared in whole or in part. Software of the digital vault 110 may be on one or more of a single computer, a group of computers which may be arranged as a cloud. The hardware of the digital vault 110 may be one or multiple computers and may be in a single location or distributed among multiple locations. The digital vault services may be embedded in hardware and/or implemented with machine readable storage media in a storage device included with or otherwise coupled or attached to a computing device.

The song repository 115 is a data storage system and may be a single storage device, an array of devices, a distribution of devices and/or cloud storage, may be in a single location or distributed among multiple locations, may be local or remote to the digital vault 110, and may be a combination of these. The song repository 115 stores song data and metadata. The song repository 115 may store both structured and unstructured data sets.

By song it is meant a file consisting of music in digital form having a play time at normal speed of between ten seconds and several hours. By normal speed it is meant a default playback speed; that is, not sped up or slowed down, and without use of fast forward to skip ahead or rewind to jump back in the song. The songs may be stored in the song repository 115 in one or multiple well-known and/or proprietary formats including, for example, MP3, MP4, WAV, AAC, OGG, AIFF, WMA, and other lossy and lossless formats.

FIG. 1 shows three identical control devices 125a, 125b, 125n, and three identical reviewing devices, 135a, 135b, 135n. This is intended to show that the system 100 can support numerous such devices. Furthermore, these devices need not be identical; they need only have the specific minimum components and capabilities described below. Furthermore, the control devices 125 and the reviewing devices 135 may be geographically distributed to the extent supported by the network 160.

Human users, not part of the system 100, are also shown. Music owners 120 are users who own songs; that is, they own the copyrights and not merely copies, or human agents who act on behalf of the copyright owners. Music owners 120 may be musicians, including songwriters and performers. Reviewing users 130 are an intended audience of the music owners, such as people who work as producers, distributors, agents, labels, potential employers, other musicians, fans, commercial purchasers of music and promoters. Music owners 120 are shown adjacent respective control devices 125. Reviewing users 130 are shown adjacent respective reviewing devices 135. The respective users 120, 130 interact with the respective devices 125, 135. The devices 125, 135 may be single-user or may support multiple users. Users may use multiple devices 125, 135 which may be synchronized. Music owners 120 may also be reviewing users 130.

The control devices 125 and reviewing devices 135 are end user computing devices through which the music owners 120 interact with the digital vault 110. These end user computing devices 125, 135 include software and/or hardware for providing functionality and features described herein. As shown in FIG. 1, the control devices 125 are laptop computers and the reviewing devices 135 are smartphones. However, other general purpose and special purpose computing devices may be used.

Figure 2:
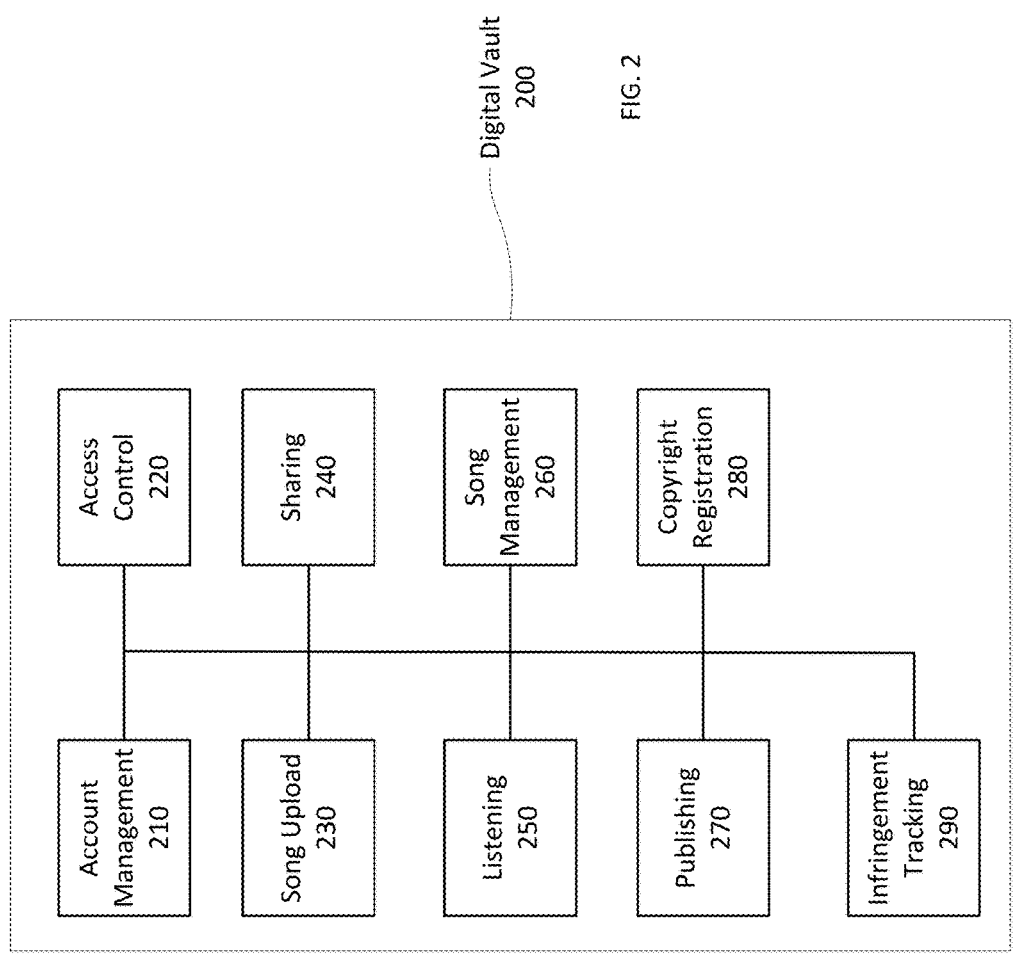
FIG. 2 is a block diagram of a digital vault for music owners.

Referring now to FIG. 2 there is shown a block diagram of a digital vault 200 for music owners, which may be the digital vault 110 of FIG. 1. The digital vault 200 has a number of modules: an account management module 210, an access control module 220, a song upload module 230, a sharing module 240, a listening module 250 and a song management module 260. The digital vault 200 may be used by music owners to share songs with reviewing users. The digital vault 200 may further include one or more of a publishing module 270, a copyright registration module 280 and an infringement tracking module 290. Additional and fewer modules or other arrangement of software, hardware and data structures may be used to achieve the processes and apparatuses described herein.

Each of the modules 210, 220, 230, 240, 250, 260, 270, 280, 290 has a respective function. The account management module 210 is for creating accounts with the digital vault for plural music owners. The access control module 220 is for providing the music owners secure access to their respective accounts. The access control module 220 also maintains security measures to prevent unauthorized access to the music owners' accounts. The security module may include encryption and decryption components, digital watermarking components, and related copy-limiting and song tracking components. The access control module 220 also provides reviewing users access to the songs in a music owner's account. The song upload module 230 is for the music owners to upload songs into the music owners' respective accounts. The sharing module 240 is for the music owners to provide reviewing users with access to their songs. The listening module 250 is for the reviewing users to stream the songs in the digital vault to which the music owners have given them access. The song management module 260 provides the music owners various options for managing the songs in their accounts. The activity module will record/track the exact time and date the reviewing users entered the digital vault, provide a timestamp of that activity by reviewer showing what specific music they listened to and what the duration of the reviewing or listening was for each specific original piece of music the music owner deposited in the vault. The activity module may also capture or receive the IP address, anonymized or non-anonymized or other identifier of a listener.

The publishing module 270 provides an automated publication function to music owners. Through the publishing module 270, a music owner can identify one or more songs in their account to publish. The publishing module 270 then automatically causes the identified songs to be streamed through a public channel, and records play information such timestamp and channel identification. The public channel may be an online streaming service, such as Spotify or Pandora, or a broadcaster such as a terrestrial radio station, or a cable music channel such as those provided by Time Warner Cable. The song may be streamed on demand by a user of the public channel, or may be included in a play list of the public channel. When the song is streamed, the publishing module 270 may also capture or receive the IP address, anonymized or non-anonymized or other identifier of a listener or recipient of the song from the streaming service. If providing songs directly from the digital vault, then a streaming player with decoder/codec may be provided by the listening module 250 or the publishing module 270 to the reviewing user.

The copyright registration module 280 provides an automated copyright application function to music owners. Through the copyright registration module 280, a music owner can identify one or more songs in their account for copyright registration. The copyright registration module 280 then collects whatever information is required to file a copyright application and, through an interface with the online application system of a copyright office such as the U.S. Copyright Office, automatically files applications for registration for the identified songs. The copyright registration module 280 may request some of the required information from the music owner. The copyright registration module 280 may obtain some of the required information automatically. For example, the digital vault 200 stores publication information about songs published through the publishing module 270, and the copyright registration module 280 may use this information in copyright applications.

The infringement tracking module 290 provides an automated function to music owners to learn about unauthorized distribution and plays of their songs. Through the infringement tracking module 290, a music owner can select one or more songs in their account, and the infringement tracking module 290 will automatically cause a search outside of the digital vault 200 for songs which match the selected songs. The infringement tracking module 290 may perform the identification using the digital watermark added to the selected song by the publishing module 270, a bit comparison of song files, a hash computation comparison or other identification technique. The infringement tracking module 290 then reports the match information, including location of the found song and a rating of confidence in the match.

The digital vault 200 may be used for other streaming media alike to music, such as video.

Figure 3:
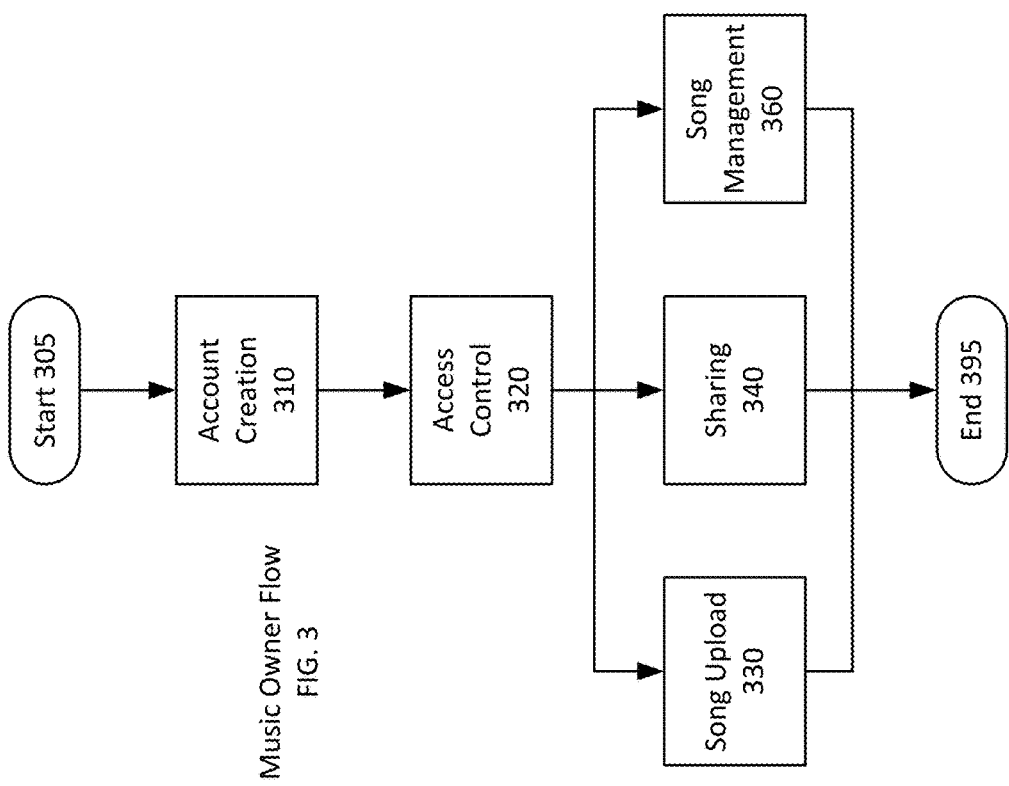
FIG. 3 is a flowchart of a method of a music owner controlling distribution of music.

Referring now to FIG. 3 there is shown a flowchart of a method of a music owner controlling distribution of songs using a digital vault, such as the digital vault 200 (FIG. 2). The flow chart has both a start 305 and an end 395, but the process is cyclical in nature. The description of FIG. 3 is with respect to one music owner, though the digital vault is a multiuser system which supports concurrent operations regarding multiple music owners and their respective accounts.

The method of FIG. 3 may include major steps corresponding to modules of FIG. 2. That is, the major steps include account creation 310 through the account management module 210, access control 320 through the access control module 220, song upload 330 through the song upload module 230, sharing of songs 340 through the sharing module 240 tracking and time stamping the activity of music reviewers through the activity tracking module and song management 360 through the song management module 260. The digital vault may provide a user interface to the music owner's control device through which the operations described herein are performed by the music owner and the control device. These user interfaces may be provided by the respective modules.

In account creation 310 a music owner accesses the digital vault, such as through a website or an app on their control device which connects to the digital vault, and activates an account. Accounts may be created at initial sign-on or in advance. At the music owner's initial connection to the digital vault, the music owner's account is activated and basic account settings configured. For example, the digital vault may obtain a user ID and a password for the music owner. After validation of the initial information the digital vault then activates the account for the music owner. Through the account management module, the music owner can change passwords and other typical account management operations.

In access control 320, the music owner logs into the digital vault. Log-in may be through the same website or app as in account creation 310, or another on the music owner's control device which is connected to the digital vault. The digital vault validates the user and, once validated provides the user/music owner access to their account. From within the access control user interface, the music owner can then perform various other operations including song upload 330, sharing 340 and song management 360.

In song upload 330, the digital vault obtains songs from the music owner. In this regard the digital vault may provide a user interface for the music owner to identify one or more songs to upload to the digital vault. The song upload user interface may allow the music owner to select songs stored in their control device or elsewhere, such as cloud storage. The digital vault may then upload the selected songs into its song repository, such as the song repository 115 (FIG. 1). Uploading a song may take the form of copying the song, or may be storage of a pointer to or address of the location identified by the music owner. The song upload module 230 automatically records a timestamp in the digital vault of receipt of each song from the music owner.

In sharing 340, the sharing user interface allows the music owner to identify one or more reviewing users and the songs in the music owner's account to which the reviewing users are provided access. The sharing user interface may also allow the music owner to set streaming limitations. The limits may be set with respect to an individual reviewing user or a group of reviewing users, and with respect to an individual song or a group of songs. The total number of plays may be limited. Total amount of time played may be limited. Availability of songs for playing may be limited, such as for fixed deadline or a period beginning from some milestone such as first play or log in. The sharing user interface may allow the music owner to select streaming players which reviewing users are authorized to use for streaming their songs, or which are not permitted. The digital vault may include counters and a tracking database to track numbers of listens, length of each listen, etc. In sharing, the sharing user interface allows the music owner to assign individual access codes authorizing the music reviewer to enter the music owner's vault and allowing for specific tracking of the music reviewer's activity and identifying the machine ID of the music reviewer. The individual access codes would be specific to an individual music reviewer and would not be transferable. The individual access codes for music reviewers would be controlled by the music owner and could be one-time review codes for a single session or may be a music reviewer specific code that could be reused only by that music reviewer on more than one reviewing occasion. A log file would be created for each individual music reviewer who receives an access code showing and time-stamping the date of their activity, the duration of their activity by specific song and the exact time they exited the music vault.

In song management 360 the song management user interface allows the music owner to manage the songs in the music owner's account. Song management may include assigning metadata and reporting. Song metadata may be obtained from different sources. The song management user interface may allow the music owner to provide metadata, such as song name, for the songs stored in their account. The digital vault, such as through the song management module 260 (FIG. 2) may automatically create and store as metadata for each song a length of the song. Other metadata may include album name, performing artist names, producer name, arranger name, recording engineer name, recording studio name, recording date and time, music author name, lyrics author name, genre and sub-genre.

The song management user interface may also provide a report to the music owner of plays of their respective songs by the reviewing users. The report may identify the respective song names and the respective reviewing users, plus playback information such as the timestamp of the start of the stream, the length of time of the stream, whether the song was played in full or stopped early, and total number of streams. Reporting may be with respect to an individual reviewing user or a group of reviewing users, or an individual song or a group of songs.

Whether a song has been fully played may be defined by criteria. The simplest criteria would be that the song has been played from start to finish without interruption. That is, the complete file has been streamed. The song management user interface may allow the music owner to define different criteria for defining a play. One play may be defined as the stream continuing for a predetermined period of time, or through a predetermined percentage. However, all authorized music plays for a music reviewer would be logged in and a record kept of any music plays by the reviewer utilizing a specific authorized access code regardless of the duration of the play period of time. This will prevent music reviewers from managing their listening time to keep the play session under a specific or predetermined period of time.

In song management 360, the user interface may also allow the music owner to associate one or more images and/or videos with songs and/or albums. The videos may include the respective songs. The song management user interface may allow the music owner to designate images, videos and other files, and upload these files in association with designated songs.

Figure 4:
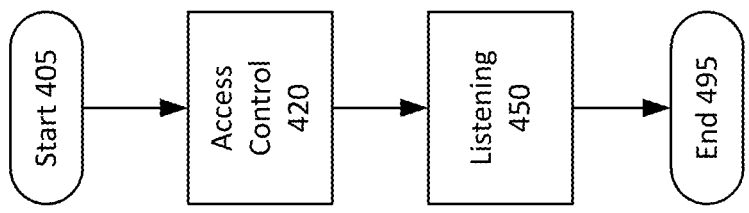
FIG. 4 is a flowchart of a method of a reviewing user receiving controlled distribution of music.

Referring now to FIG. 4 there is shown a flowchart of a method of a reviewing user receiving controlled distribution of music. The flow chart has both a start 405 and an end 495, but the process is cyclical in nature. The description of FIG. 4 is with respect to one reviewing user, but the digital vault supports concurrent operations regarding multiple reviewing users along with multiple music owners.

The method of FIG. 4 may include major steps corresponding to the modules of FIG. 2. That is, the major steps include access control 420 through the access control module 220 and listening 450 through the listening module 250. The digital vault may provide a user interface to the reviewing user's reviewing device through which the operations described herein are performed by the reviewing user and the reviewing device. These user interfaces may be provided by the respective modules.

In access control 420 the reviewing user, through their reviewing device, is provided access to songs in a music owner's account. This may be in response to a music owner, in the access control step 320 of FIG. 3, designating the reviewing user for access to songs in the music owner's account. The digital vault may then send a message to the reviewing user, inviting the reviewing user to access the songs. The invitation may include song metadata such as song name and name of the music owner. The invitation may be an email message which, when opened obtains data from the digital vault and also shares metadata from the reviewing device with the digital vault. The invitation may be provided through other electronic communications channels, such as text messaging and social networks. The digital vault may support offline invitations, such as through automated mailing.

The invitation may include links or credentials for the reviewing user to listen to songs in the music owner's account. When activated by the reviewing user, the link may cause a user interface display from the digital vault to be displayed on the reviewing device. The user interface may provide additional metadata about the song and display images or video, such as that obtained by the song management module 360 (FIG. 3). Activation of the link may cause a streaming media player on the reviewing device to be activated. The invitation may include a specific access code that is specific to the music reviewer and non-transferable. The access code may be for a single music review session or may be for multiple music review sessions over a predetermined period of time with a specific beginning and end established by the music owner for the specific music reviewer.

When the reviewing user gains access to the song, the digital vault may capture relevant event metadata such as identification of the reviewing user and an activation timestamp.

Reviewing users may be provided with an access code, such as from the music owner or the digital vault, that is either a single use, disposable access code or a user-specific, non-transferable access code that remains valid for a pre-determined period of time established by the music owner. In the event that the music reviewer requests additional affiliated members of the music reviewer's organization or network be allowed to access the music owner's music in their vault, the music owner could provide for additional authorized users to the specific access code given to the music reviewer provided through the use of a suffix related to a specific individual that is part of the music reviewer's organization or network. Alternatively, a new access code could be issued to every individual music reviewer regardless of their affiliation with another authorized music reviewer. Further a mechanism could be created whereby any additional authorized music reviewers added to the primary authorized music reviewer's organization or network, would be issued single use or extended, pre-determined period of time access codes under a group umbrella access code designation so that all affiliated members of a reviewer's circle of individuals can be tracked as part of a single music reviewer group. Each subsequent request to listen to or play the music owner's music by the music reviewer would require a new access code or would have to qualify under the pre-determined duration and scope of the access code already issued to that music reviewer.

After accessing the digital vault 420 the reviewing user may begin listening 450. Streaming of the song may initiate automatically. There may be a user interface which allows the reviewing user to change the streaming of the song. This user interface may be integrated with the streaming media player in the reviewing device, and/or provided by the digital vault. Through this user interface the user may request to jump back or ahead in the stream. However, the listening module 320 may limit the reviewing user to plays, streaming media players and stream controls as set by the music owner in the sharing module 340. The listening module 450 may record event metadata of each stream by the reviewing user, such as an identifier of the reviewing user, a timestamp of the start of the stream, and either a timestamp of the stop of the stream or a length of time of the stream. The metadata may also include stream controls by the reviewing user such as requests to jump back or ahead in the stream.

The listening module 250 may record the type of streaming player used. The listening module 250 may restrict the reviewing user to stream using only the streaming players selected by the music owner, such as through the sharing module 340.

During listening 450, the reviewing user may be provided options to listen to additional songs, or to repeat a song, such as until the reviewing user is satisfied.

Figure 5:
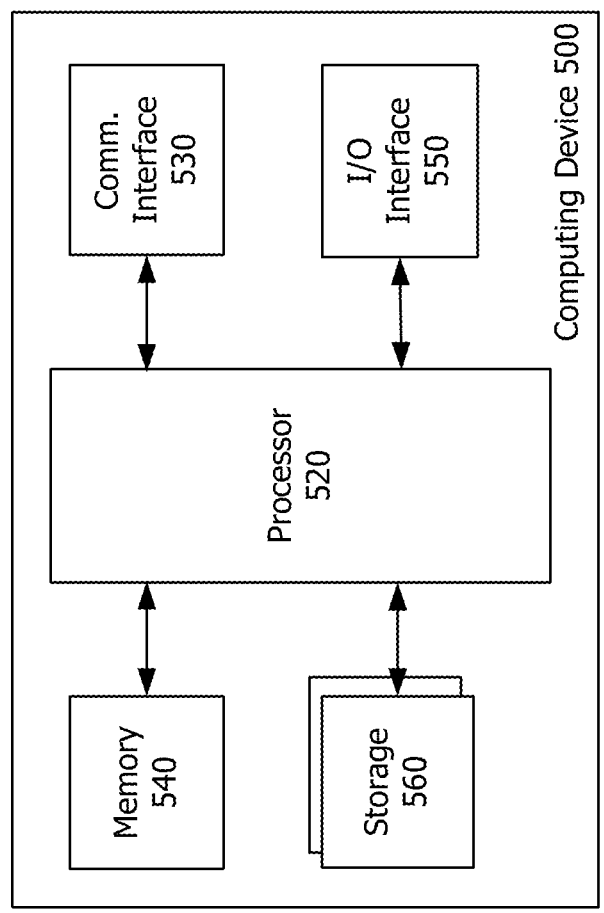
FIG. 5 is a block diagram of a computing device.

Referring now to FIG. 5 there is shown a computing device 500. The computing devices described herein, such as the digital vault, control devices and reviewing devices, may be configured as shown in FIG. 5. The computing device 500 includes a processor 520, communications interface 530, memory 540, and an input/output interface 550. Further, although these elements are shown independently of one another, each may, in some cases, be integrated into one another.

The computing device 500 is representative of the mobile devices and other computing devices discussed herein. For example, the computing device 500 may be or be a part of a mobile device or a server. The computing device 500 may include software and/or hardware for providing functionality and features described herein. The computing device 500 may therefore include one or more of: logic arrays, memories, analog circuits, digital circuits, software, firmware and processors. The hardware and firmware components of the computing device 500 may include various specialized units, circuits, software and interfaces for providing the functionality and features described herein. The processes, functionality and features may be embodied in whole or in part in software which operates on the computing device 500 and may be in the form of firmware, an application program, an app, a dynamic linked library (DLL), a script, one or more subroutines, or an operating system component or service. The hardware and software and their functions may be distributed such that some components are performed by the computing device 500 and others by other devices.

The processor 520 may be or include one or more microprocessors, application specific integrated circuits (ASICs), or a system-on-a-chip (SOCs).

The communications interface 530 includes an interface for communicating with external devices. In the case of a computing device 500, the communications interface 530 may enable wireless communication with a mobile device. The communications interface 530 may be wired or wireless. The communications interface 530 may rely upon short to medium range wireless protocols like Bluetooth®, infrared, and/or 802.11x wireless or another wireless protocols then in existence.

The memory 540 may be or include RAM, ROM, DRAM, SRAM and MRAM or other memory systems, and may include firmware, such as static data or fixed instructions, boot code, system functions, configuration data, and other routines used during the operation of the computing device 500 and processor 520. The memory 540 also provides a storage area for data and instructions associated with applications and data handled by the processor 520.

The I/O interface 550 interfaces the processor 520 to components external to the computing device 500. In the case of servers and mobile devices, these may be keyboards, mice, pens, voice activated systems and other peripherals.

The storage 560 is non-transient electronic, machine readable media which provides non-volatile, bulk or long term storage of data or instructions in the computing device 500. The software described herein may be stored in the storage 560. Storage devices include hard disk drives, DVD drives, flash memory devices, and other storage devices. Multiple storage devices may be provided or available to the computing device 500. Some of these storage devices may be external to the computing device 500, such as network storage, cloud-based storage, or storage on a related mobile device. This storage 560 may store some or all of the instructions for the computing device 500. The term "storage medium", as used herein, specifically excludes transitory medium such as propagating waveforms and radio frequency signals.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A digital vault for songs, the songs consisting of music in digital form, the digital vault comprising:
an account management module for creating accounts with the digital vault for plural music owners;
an access control module for providing the music owners secure access to their respective accounts and preventing unauthorized access to the music owners' accounts;
a song upload module for the music owners to upload songs into the music owners' respective accounts, and for automatically recording a timestamp in the digital vault of receipt of each song;
a sharing module for the music owners to identify one or more reviewing users and to set streaming limitations for the reviewing users, assigned on a per-song basis;
a listening module for the reviewing users to stream the songs in the digital vault to which the music owners have given them access, the listening module responsive to reviewing user requests to jump back or ahead in a given stream, wherein streaming by the reviewing users is limited by the listening module according to the streaming limitations set by the music owners in the sharing module, wherein the listening module records for each stream an identifier of the reviewing user requesting the stream, a timestamp of the start of the stream, either a timestamp of the stop of the stream or a length of time of the stream, and the reviewing user requests to jump back or ahead in the stream;
a song management module for the music owners to provide metadata for the songs stored in the music owners' respective accounts, the metadata including song name; and to report to the music owners reports of streams of their respective songs by the reviewing users, including identifying the respective song names and the respective reviewing users, the timestamp of the start of the stream, the length of time of the stream, and total number of streams to the authorized reviewing users;
wherein the listening module obtains a type of streaming player device used;
wherein the sharing module is for the music owners to select streaming player devices which reviewing users are authorized to use for streaming their songs; and the listening module restricts the reviewing users to stream using only the selected streaming player devices.

2. The digital vault for music owners of claim 1 wherein the song management module reports the type of streaming player device used.

3. The digital vault for music owners of claim 1 wherein the song management module defines one play if the stream begins.

4. The digital vault for music owners of claim 3 wherein the song management module further defines one play if the stream has continued for a predetermined period.

5. The digital vault for music owners of claim 1 wherein the song management module automatically creates and stores as metadata for each song a length of the song.

6. The digital vault for music owners of claim 1 wherein the song management module stores as metadata for at least some of the songs one or more of album name, performing artists, producer name, arranger name, music author name, lyrics author name, genre, sub-genre.

7. The digital vault for music owners of claim 1 wherein the song management module stores related files for at least some of the songs.

8. The digital vault for music owners of claim 7 wherein the related files include images and videos which includes the respective songs.

9. The digital vault for music owners of claim 1 including a publishing module for the music owners to identify one or more songs in the music owners' accounts to publish; and to automatically cause the identified songs to be streamed through a public channel.

10. The digital vault for music owners of claim 1 including a copyright registration module for the music owners to identify one or more songs in the music owners' accounts for copyright registration; and to automatically cause the applications for copyright registration to be filed for the identified songs.

11. The digital vault for music owners of claim 1 including an infringement tracking module automatically searching outside of the digital vault for songs which match the songs in the digital vault.

12. The digital vault for music owners of claim 1 wherein the sharing module provides the music owners links or credentials for inviting the reviewing users to listen to their songs in the digital vault.

13. The digital vault for music owners of claim 1 wherein the streaming limitations include a maximum number of plays of a respective stream by a respective reviewing user.

14. The digital vault for music owners of claim 1 applied to video and other streaming media alike to music.

15. The digital vault for music owners of claim 1 comprising non-volatile machine readable medium storing the modules as software.

16. The digital vault for music owners of claim 1 comprising an activity module to record/track the exact time and date the reviewing users entered the digital vault, provide a timestamp of that activity by reviewer showing what specific music they listened to and what the duration of the reviewing or listening was for each specific original piece of music the music owner deposited in the vault.

17. The digital vault for music owners of claim 16, wherein the activity module captures or receives the IP address, anonymized or non-anonymized or other identifier of a listener.

18. A digital vault for songs, the songs consisting of music in digital form, the digital vault comprising:
- an account management module for creating accounts with the digital vault for plural music owners;
- an access control module for providing the music owners secure access to their respective accounts and preventing unauthorized access to the music owners' accounts;
- a song upload module for the music owners to upload songs into the music owners' respective accounts, and for automatically recording a timestamp in the digital vault of receipt of each song;
- a sharing module for the music owners to identify one or more reviewing users and to set streaming limitations for the reviewing users, assigned on a per-song basis;
- a listening module for the reviewing users to stream the songs in the digital vault to which the music owners have given them access, the listening module responsive to reviewing user requests to jump back or ahead in a given stream, wherein streaming by the reviewing users is limited by the listening module according to the streaming limitations set by the music owners in the sharing module, wherein the listening module records for each stream an identifier of the reviewing user requesting the stream, a timestamp of the start of the stream, either a timestamp of the stop of the stream or a length of time of the stream, and the reviewing user requests to jump back or ahead in the stream;
- a song management module for the music owners to provide metadata for the songs stored in the music owners' respective accounts, the metadata including song name; and to report to the music owners reports of streams of their respective songs by the reviewing users, including identifying the respective song names and the respective reviewing users, the timestamp of the start of the stream, the length of time of the stream, and total number of streams to the authorized reviewing users;
- a publishing module for the music owners to identify one or more songs in the music owners' accounts to publish and to identify specific public streaming channels, the public streaming channels including at least one of an online streaming service or a terrestrial radio station or a cable music; the publishing module further to automatically cause the identified songs to be streamed through the identified public streaming channels and to automatically obtain timestamp and channel identification for each stream of the songs identified for streaming through the identified specific public streaming channels.

19. The digital vault for music owners of claim 18 wherein the song management module defines one play if the stream begins.

20. The digital vault for music owners of claim 19 wherein the song management module further defines one play if the stream has continued for a predetermined period.

21. The digital vault for music owners of claim 18 wherein the song management module automatically creates and stores as metadata for each song a length of the song.

22. The digital vault for music owners of claim 18 wherein the song management module stores as metadata for at least some of the songs one or more of album name, performing artists, producer name, arranger name, music author name, lyrics author name, genre, sub-genre.

23. The digital vault for music owners of claim 18 wherein the song management module stores related files for at least some of the songs.

24. The digital vault for music owners of claim 23 wherein the related files include images and videos which includes the respective songs.

25. The digital vault for music owners of claim 18 including a copyright registration module for the music owners to identify one or more songs in the music owners' accounts for copyright registration; and to automatically cause the applications for copyright registration to be filed for the identified songs.

26. The digital vault for music owners of claim 18 including an infringement tracking module automatically searching outside of the digital vault for songs which match the songs in the digital vault.

27. The digital vault for music owners of claim 18 wherein the sharing module provides the music owners links or credentials for inviting the reviewing users to listen to their songs in the digital vault.

28. The digital vault for music owners of claim 18 wherein the streaming limitations include a maximum number of plays of a respective stream by a respective reviewing user.

29. The digital vault for music owners of claim 18 applied to video and other streaming media alike to music.

30. The digital vault for music owners of claim 18 comprising non-volatile machine readable medium storing the modules as software.

31. The digital vault for music owners of claim 18 comprising an activity module to record/track the exact time and date the reviewing users entered the digital vault, provide a timestamp of that activity by reviewer showing what specific music they listened to and what the duration of the reviewing or listening was for each specific original piece of music the music owner deposited in the vault.

32. The digital vault for music owners of claim 31, wherein the activity module captures or receives the IP address, anonymized or non-anonymized or other identifier of a listener.

* * * * *